(12) United States Patent
Farnworth

(10) Patent No.: US 7,021,915 B2
(45) Date of Patent: Apr. 4, 2006

(54) LAYER THICKNESS CONTROL FOR STEREOLITHOGRAPHY UTILIZING VARIABLE LIQUID ELEVATION AND LASER FOCAL LENGTH

(75) Inventor: Warren M. Farnworth, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/987,843

(22) Filed: Nov. 12, 2004

(65) Prior Publication Data
US 2005/0129795 A1    Jun. 16, 2005

Related U.S. Application Data

(62) Division of application No. 10/225,945, filed on Aug. 22, 2002, now Pat. No. 6,896,837, which is a division of application No. 09/651,175, filed on Aug. 29, 2000, now Pat. No. 6,607,689.

(51) Int. Cl.
*H01L 21/56* (2006.01)
*B29C 41/20* (2006.01)

(52) U.S. Cl. .............. 425/110; 425/174.4; 425/135
(58) Field of Classification Search .............. 425/110, 425/174.4, 135
See application file for complete search history.

(56) References Cited

U.S. PATENT DOCUMENTS

| | | | |
|---|---|---|---|
| 4,575,330 A | 3/1986 | Hull | 425/174.4 |
| 4,996,010 A | 2/1991 | Modrek | 425/174.4 |
| 4,999,143 A | 3/1991 | Hull et al. | 425/174.4 |
| 5,015,424 A | 5/1991 | Smalley | 425/174.4 |
| 5,058,988 A | 10/1991 | Spence | 425/174.4 |
| 5,059,021 A | 10/1991 | Spence et al. | 425/174 |
| 5,059,359 A | 10/1991 | Hull et al. | 425/174.4 |
| 5,071,337 A | 12/1991 | Heller et al. | 425/174.4 |
| 5,096,530 A | 3/1992 | Cohen | 425/174.4 |
| 5,104,592 A | 4/1992 | Hull et al. | 425/174.4 |

(Continued)

FOREIGN PATENT DOCUMENTS

DE        19952998        9/2001

(Continued)

OTHER PUBLICATIONS

U.S. Appl. No. 10/663,402, filed Sep. 16, 2003, entitled "Processes for Facilitating Removal of Stereolithographically Fabricated Objects From Platens of Stereolithographic Fabrication Equipment, Object Release Elements fro Effecting Such Processes, Systems and Fabrication Processes Employing the Object Release Elements, and Objects which have been Fabricated Using the Object Release Elements", inventor Farnworth et al.

(Continued)

*Primary Examiner*—Robert B. Davis
(74) *Attorney, Agent, or Firm*—TraskBritt

(57) ABSTRACT

An apparatus and method for controlling the surface level of a liquid residing within a relatively vertically stationary workpiece support platform disposed within a reservoir for use in stereolithographic processes wherein a layered object or structure is formed by selectively curing portions of the liquid to at least a semisolid state in multiple, at least partially superimposed layers. Providing precise control of liquid depth over the vertically stationary platform as well as focusing of a laser beam for curing the liquid at the varying surface levels thereof relative to the vertically stationary platform is effected using a laser range finder system controlled by a computer used to control the stereolithographic process in a closed loop fashion.

10 Claims, 4 Drawing Sheets

U.S. PATENT DOCUMENTS

| | | | |
|---|---|---|---|
| 5,123,734 A | 6/1992 | Spence et al. | 425/174.4 |
| 5,130,064 A | 7/1992 | Smalley et al. | 264/308 |
| 5,133,987 A | 7/1992 | Spence et al. | 425/174.4 |
| 5,141,680 A | 8/1992 | Almquist et al. | 425/174.4 |
| 5,143,663 A | 9/1992 | Leyden et al. | 425/174.4 |
| 5,164,128 A | 11/1992 | Modrek et al. | 425/174.4 |
| 5,173,220 A | 12/1992 | Reiff et al. | 264/308 |
| 5,174,931 A | 12/1992 | Almquist et al. | 425/174.4 |
| 5,182,055 A | 1/1993 | Allison et al. | 264/308 |
| 5,182,056 A | 1/1993 | Spence et al. | 425/174.4 |
| 5,182,715 A | 1/1993 | Vorgitch et al. | 425/174.4 |
| 5,184,307 A | 2/1993 | Hull et al. | 425/174.4 |
| 5,192,469 A | 3/1993 | Smalley et al. | 425/174.4 |
| 5,192,559 A | 3/1993 | Hull et al. | 425/174.4 |
| 5,209,878 A | 5/1993 | Smalley et al. | 264/308 |
| 5,234,636 A | 8/1993 | Hull et al. | 264/308 |
| 5,238,639 A | 8/1993 | Vinson et al. | 425/174.4 |
| 5,248,456 A | 9/1993 | Evans, Jr. et al. | 425/174.4 |
| 5,256,340 A | 10/1993 | Allison et al. | 425/174.4 |
| 5,264,061 A | 11/1993 | Juskey et al. | 264/308 |
| 5,267,013 A | 11/1993 | Spence | 425/174.4 |
| 5,278,442 A | 1/1994 | Prinz et al. | 264/255 |
| 5,287,435 A | 2/1994 | Cohen et al. | |
| 5,321,622 A | 6/1994 | Snead et al. | 700/182 |
| 5,345,391 A | 9/1994 | Hull et al. | 425/174.4 |
| 5,358,673 A | 10/1994 | Heller et al. | 264/401 |
| 5,447,822 A | 9/1995 | Hull et al. | 425/174.4 |
| 5,482,659 A | 1/1996 | Sauerhoefer | |
| 5,484,314 A | 1/1996 | Farnworth | 445/24 |
| 5,495,328 A | 2/1996 | Spence et al. | 425/174.4 |
| 5,501,824 A | 3/1996 | Almquist et al. | 425/174.4 |
| 5,508,489 A | 4/1996 | Benda et al. | |
| 5,545,367 A | 8/1996 | Bae et al. | 264/401 |
| 5,693,144 A | 12/1997 | Jacobs et al. | 118/429 |
| 5,695,707 A | 12/1997 | Almquist et al. | 425/174.4 |
| 5,705,117 A | 1/1998 | O'Connor et al. | 264/401 |
| 5,776,409 A | 7/1998 | Almquist et al. | 425/174.4 |
| 5,779,967 A | 7/1998 | Hull | 425/174.4 |
| 5,840,239 A | 11/1998 | Partanen et al. | 264/401 |
| 5,855,718 A | 1/1999 | Nguyen et al. | 264/401 |
| 5,855,836 A | 1/1999 | Leyden et al. | 264/401 |
| 5,897,825 A | 4/1999 | Fruth et al. | 425/174.4 |
| 5,902,537 A | 5/1999 | Almquist et al. | 425/174.4 |
| 5,902,538 A | 5/1999 | Kruger et al. | 264/401 |
| 5,904,889 A | 5/1999 | Serbin et al. | 425/174.4 |
| 5,943,235 A | 8/1999 | Earl et al. | 700/98 |
| 5,945,058 A | 8/1999 | Manners et al. | 425/174.4 |
| 6,021,358 A | 2/2000 | Sachs | |
| 6,158,346 A | 12/2000 | Zhang | |
| 6,251,488 B1 | 6/2001 | Miller et al. | 427/596 |
| 6,259,962 B1 | 7/2001 | Gothait | 700/219 |
| 6,268,584 B1 | 7/2001 | Keicher et al. | 219/121.64 |
| 6,337,122 B1 | 1/2002 | Grigg et al. | |
| 6,391,251 B1 | 5/2002 | Keicher et al. | 425/78 |
| 6,482,576 B1 | 11/2002 | Farnworth et al. | 264/401 |
| 6,483,596 B1 | 11/2002 | Philippi et al. | |
| 6,537,482 B1 | 3/2003 | Farnworth | 264/272.17 |
| 6,544,465 B1 | 4/2003 | Farnworth et al. | |
| 6,544,902 B1 | 4/2003 | Farnworth | 438/781 |
| 6,549,821 B1 | 4/2003 | Farnworth et al. | 264/272.17 |
| 6,658,314 B1 | 12/2003 | Gothait | 264/409 |
| 6,709,795 B1 | 3/2004 | Farnworth et al. | 264/401 |
| 6,740,476 B1 | 5/2004 | Farnworth et al. | 264/401 |
| 2002/0090410 A1 | 7/2002 | Tochimolo et al. | |
| 2002/0171177 A1 | 11/2002 | Kritchman et al. | 264/401 |
| 2003/0003179 A1 | 1/2003 | Farnworth et al. | 425/174.4 |
| 2003/0003180 A1 | 1/2003 | Farnworth et al. | 425/174.4 |
| 2003/0043360 A1 | 3/2003 | Farnworth | 430/311 |
| 2003/0068584 A1 | 4/2003 | Farnworth et al. | 425/174.4 |
| 2003/0090006 A1 | 5/2003 | Farnworth | 257/787 |
| 2003/0093173 A1 | 5/2003 | Farnworth et al. | 700/120 |
| 2003/0151167 A1 | 8/2003 | Kritchman et al. | 264/401 |
| 2003/0155693 A1 | 8/2003 | Farnworth et al. | 264/401 |
| 2003/0173713 A1 | 9/2003 | Huang | |
| 2003/0207213 A1 | 11/2003 | Farnworth | 264/401 |
| 2003/0209837 A1 | 11/2003 | Farnworth | 264/401 |
| 2004/0142058 A1 | 7/2004 | Farnworth | 425/174.4 |
| 2004/0251242 A1 | 12/2004 | Suh | |

FOREIGN PATENT DOCUMENTS

| | | |
|---|---|---|
| JP | 56151516 | 11/1981 |
| JP | 08150662 | 6/1998 |
| JP | 2000263603 | 9/2000 |
| WO | WO 97/17664 | 5/1997 |

OTHER PUBLICATIONS

Miller et al, "Maskless Mesoscale Material Deposition", Deposition Technology, Sep. 2001, pp. 20-22.

Miller, "New Laser-Directed Deposition Technology", Microelectronic Fabrication, Aug. 2001, p. 16.

Webpage, Objet Prototyping the Future, How it Works, 2 pages, 2003.

Webpage, Objet Prototyping the Future, Object Full Core 700 Series, 1 pg, no date.

European Search Report dated Aug. 17, 2005 (5 pages).

LAYER THICKNESS CONTROL FOR STEREOLITHOGRAPHY UTILIZING VARIABLE LIQUID ELEVATION AND LASER FOCAL LENGTH

CROSS-REFERENCE TO RELATED APPLICATION

This application is a divisional of U.S. application Ser. No. 10/225,945, filed Aug. 22, 2002, now U.S. Pat. No. 6,896,837, issued May 24, 2005, which application is a divisional of U.S. application Ser. No. 09/651,175, filed Aug. 29, 2000, now U.S. Pat. No. 6,607,689, issued Aug. 19, 2003.

BACKGROUND OF THE INVENTION

1. Field of the Invention

The present invention relates generally to stereolithography and, more specifically, to an apparatus and method of controlling the thickness of layers of stereolithographic materials forming a layered object utilizing variable elevation of the surface of a liquid material from which such layers are formed.

2. State of the Art

In the past decade, a manufacturing technique termed "stereolithography," also known as "layered manufacturing," has evolved to a degree where it is employed in many industries.

Essentially, stereolithography as conventionally practiced, involves utilizing a computer to generate a three-dimensional (3-D) mathematical simulation or model of an object to be fabricated, such generation usually effected with 3-D computer-aided design (CAD) software. The model or simulation is mathematically separated or "sliced" into a large number of relatively thin, parallel, usually vertically superimposed layers, each layer having defined boundaries and other features associated with the model (and thus the actual object to be fabricated) at the level of that layer within the exterior boundaries of the object. A complete assembly or stack of all of the layers defines the entire object, and surface resolution of the object is, in part, dependent upon the thickness of the layers.

The mathematical simulation or model is then employed to generate an actual object by building the object, layer by superimposed layer. A wide variety of approaches to stereolithography by different companies has resulted in techniques for fabrication of objects from both metallic and non-metallic materials. Regardless of the material employed to fabricate an object, stereolithographic techniques usually involve disposition of a layer of unconsolidated or unfixed material corresponding to each layer within the object boundaries, followed by selective consolidation or fixation of the material to at least a semisolid state in those areas of a given layer corresponding to portions of the object, the consolidated or fixed material also at that time being substantially concurrently bonded to a lower layer. The unconsolidated material employed to build an object may be supplied in particulate or liquid form, and the material itself may be consolidated, fixed or cured, or a separate binder material may be employed to bond material particles to one another and to those of a previously-formed layer. In some instances, thin sheets of material may be superimposed to build an object, each sheet being fixed to a next-lower sheet and unwanted portions of each sheet removed, a stack of such sheets defining the completed object. When particulate materials are employed, resolution of object surfaces is highly dependent upon particle size, whereas when a liquid is employed, resolution is highly dependent upon the minimum surface area of the liquid which can be fixed (cured) and the minimum thickness of a layer which can be generated given the viscosity of the liquid and other parameters such as transparency to radiation or particle bombardment used to effect at least a partial cure of the liquid to a structurally stable state. Of course, in either case, resolution and accuracy of object reproduction from the CAD file is also dependent upon the ability of the apparatus used to fix the material to precisely track the mathematical instructions indicating solid areas and boundaries for each layer of material. Toward that end, and depending upon the layer being fixed, various fixation approaches have been employed, including particle bombardment (electron beams), disposing a binder or other fixative (such as by ink-jet printing techniques), or irradiation using heat or specific wavelength ranges.

An early application of stereolithography was to enable rapid fabrication of molds and prototypes of objects from CAD files. Thus, either male or female forms on which mold material might be disposed might be rapidly generated. Prototypes of objects might be built to verify the accuracy of the CAD file defining the object and to detect any design deficiencies and possible fabrication problems before a design was committed to large-scale production.

Stereolithography has also been employed to develop and refine object designs in relatively inexpensive materials, and has also been used to fabricate small quantities of objects where the cost of conventional fabrication techniques is prohibitive for same, such as in the case of plastic objects conventionally formed by injection molding. It is also known to employ stereolithography in the custom fabrication of products generally built in small quantities or where a product design is rendered only once. Finally, it has been appreciated in some industries that stereolithography provides a capability to fabricate products, such as those including closed interior chambers or convoluted passageways, which cannot be fabricated satisfactorily using conventional manufacturing techniques.

More recently, stereolithography has been used to apply material to preformed electronic components and resulting structures with a high degree of precision. For example, stereolithographic techniques may be used to apply protective or alignment structures to substrates. A substrate used for effecting electrical testing of semiconductor devices or to connect same to each other or to higher-level packaging may be provided with a protective structure in the form of a layer of dielectric material having a controlled thickness or depth and defining precisely sized, shaped and located apertures through which conductive terminals on the surface of the substrate may be accessed for testing of a semiconductor die disposed on the substrate.

The dielectric layer, in addition to physically protecting, sealing and isolating circuit traces on the substrate from connective elements on the superimposed semiconductor die to prevent shorting, may be employed as desired as a structure to mechanically align the die with the substrate for proper communication of the connective elements with the substrate terminals. This may be effected in the context of a so-called "flip-chip" semiconductor die bearing a pattern of connective elements projecting from the active surface of the die (such as solder bumps or conductive or conductor-bearing polymers), by using precisely sized and located apertures in the dielectric material to partially receive the connective elements. In addition to, or in lieu of, such an alignment structure approach, upwardly-projecting alignment elements comprising the same material as that of the dielectric layer may be fabricated on the dielectric layer. Such alignment elements may, for example, comprise C-shaped projections located on opposing sides of an intended location for the semiconductor die, L-shaped projections at corners of the intended die location, or linear segments parallel to, and defining a slightly larger area than, the side of a rectangular die. A more detailed disclosure of the foregoing may be found in U.S. Pat. No. 6,524,346, assigned to the assignee of the present invention and the disclosure of which patent is hereby incorporated herein by reference.

In addition, it has also been proposed to employ stereolithography to form packaging and other protective structures for semiconductor dice and lead frames, wire bonds and other associated structures, and to employ stereolithographic apparatus in combination with so-called "machine vision" systems to avoid the necessity of precisely positioning or aligning preformed structures for application of materials thereto using stereolithography. A more detailed disclosure of the foregoing may be found in U.S. Pat. No. 6,524,346, assigned to the assignee of the present invention and the disclosure of which patent is hereby incorporated herein by reference.

All such layered structures may be formed using stereolithographic techniques. Formation of these structures is accomplished by suspending a support platform within a reservoir containing a curable liquid, such as a photopolymer, as commonly used in stereolithography. If the layered structure or structures are to be formed in association with other, preformed objects such as substrates, semiconductor dice or other electronic components, such objects are placed on the platform before the stereolithographic process is initiated. The platform is vertically moveable such that it (and objects carried thereon) may be moved in precise increments into or out of the curable liquid so that the surface level of the photopolymer, which remains constant, is a desired level above the platform surface or above a previously formed layer of photopolymer in which polymerization has been initiated. Layer thickness and shape for the desired stereolithographic formations are typically programmed into a computer control system which monitors and controls the stereolithographic process. In response to the control system, the platform upon which a substrate is suspended is lowered into the reservoir to a desired location such that a layer of curable liquid in the reservoir covers the suspended substrate. Precisely focused electromagnetic radiation in the form of a fixed focal length ultraviolet (UV) wavelength laser focused at a distance corresponding to the surface of the liquid photopolymer in the reservoir is traversed over the platform in a desired path to fix or cure at least a portion of the liquid material on or over the substrate. The platform is then lowered by a depth or distance equal to a thickness of the next desired layer to provide a new layer of curable liquid over the substrate and the laser is again selectively traversed over the platform to cure at least a portion of the liquid. The process is then repeated layer by layer until the desired stereolithographic structure is formed on the substrate. The platform is then raised above the level of the liquid, uncured liquid is drained and the substrate is removed.

It would be desirable to employ a stereolithographic method which does not require vertical movement of a platform disposed in a reservoir of curable liquid material with disturbance to the liquid attendant to such movements and the complexity of apparatus required to suspend a platform in a movable manner while maintaining the platform upper surface in a perfectly level orientation to ensure uniform layer thickness. In addition, it would be desirable to be able to employ a relatively shallow reservoir so as to minimize the amount of liquid material therein at any time and thus conserve same and avoid contamination thereof.

BRIEF SUMMARY OF THE INVENTION

The present invention provides a method and apparatus for forming layered structures for various applications, one of which may be exemplified by forming a material in one or more layers with a high degree of precision adjacent a preformed electronic component. The present invention employs computer-controlled, 3-D CAD initiated, stereolithographic techniques for the formation of layered structures.

In one embodiment, the layered structures are fabricated by disposing a vertically fixed or stationary platform having a level upper surface in a reservoir which contains a curable liquid, such as a photopolymer, which responds to exposure to selective wavelength electromagnetic radiation by initiation of polymerization. The volume of curable liquid in the reservoir may be varied to manipulate the surface level of the curable liquid to a desired elevation above the platform upper surface or an upper surface of a previously formed layer to provide a desired depth of curable liquid to be cured into each layer of a desired structure. A liquid level sensor or a distance sensor is employed to calculate an appropriate focal length to the variable-elevation surface level of the curable liquid from a reference location directing a laser beam toward the platform from above. Multiple sensors, preferably three, may also be employed to verify or assist in correcting the orientation of the platform to ensure that it is perfectly level before formation of a layered structure or structures is commenced. A focusing device associated with a source of the laser is employed, responsive to the determined surface level of the curable liquid, to adjust and optimize the focal length of a laser beam generated by the laser source to coincide with the surface level of the curable liquid to maximize resolution and power density at that location.

In other embodiments of the invention, all or a portion of a reservoir in which the platform is disposed are vertically moved to manipulate the surface level of the liquid relative to the platform.

Another embodiment encompasses a method and apparatus for stereolithographically undercoating preformed objects such as flip-chip configured semiconductor dice.

BRIEF DESCRIPTION OF THE SEVERAL VIEWS OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE INVENTION

Exemplary stereolithography systems are described in great detail in United States Patents assigned to 3D Systems, Inc. of Valencia, Calif., such patents including, without limitation, U.S. Pat. Nos. 4,575,330; 4,929,402; 4,996,010; 4,999,143; 5,015,424; 5,058,988; 5,059,021; 5,096,530; 5,104,592; 5,123,734; 5,130,064; 5,133,987; 5,141,680; 5,143,663; 5,164,128; 5,174,931; 5,174,943; 5,182,055; 5,182,056; 5,182,715; 5,184,307; 5,192,469; 5,192,559; 5,209,878; 5,234,636; 5,236,637; 5,238,639; 5,248,456; 5,256,340; 5,258,146; 5,267,013; 5,273,691; 5,321,622; 5,344,298; 5,345,391; 5,358,673; 5,447,822; 5,481,470; 5,495,328; 5,501,824; 5,554,336; 5,556,590; 5,569,349; 5,569,431; 5,571,471; 5,573,722; 5,609,812; 5,609,813; 5,610,824; 5,630,981; 5,637,169; 5,651,934; 5,667,820; 5,672,312; 5,676,904; 5,688,464; 5,693,144; 5,695,707; 5,711,911; 5,776,409; 5,779,967; 5,814,265; 5,840,239; 5,854,748; 5,855,718; and 5,855,836. The disclosure of each of the foregoing patents is hereby incorporated herein by this reference. The stereolithographic apparatus disclosed in the foregoing patents may be modified as described in previously referenced and incorporated U.S. Pat. No. 6,524,346, assigned to the assignee of the present invention. As noted above, this earlier application relates to the use of a "machine vision" system with suitable programming of the computer controlling the stereolithographic process, eliminating the need for accurate positioning or mechanical alignment of workpieces to which material is stereolithographically applied, and expands the use to large numbers of workpieces which may have differing orientation, size, thickness and surface topography.

Figure 1:
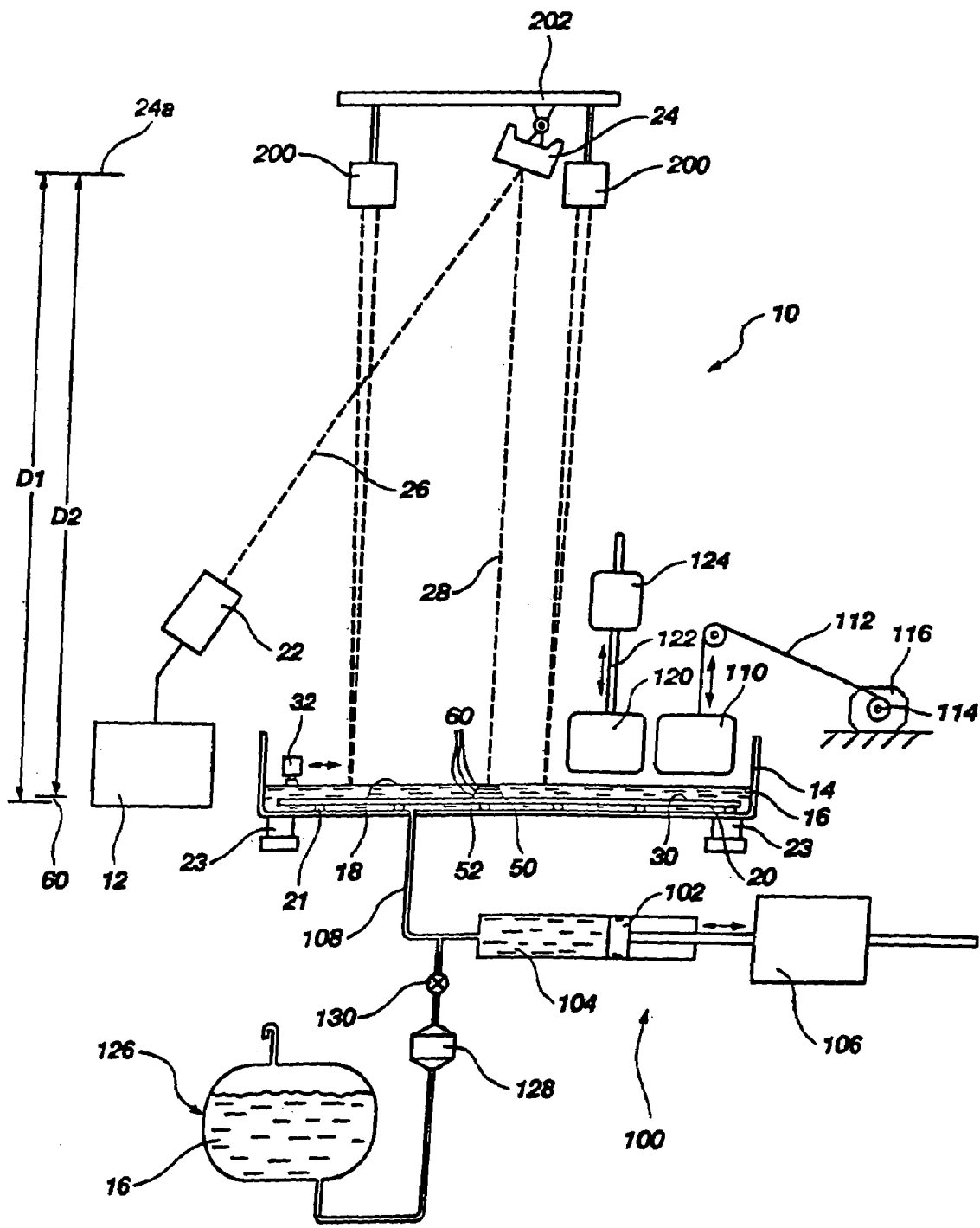
FIG. 1 illustrates a representative schematic side view of one embodiment of the apparatus of the present invention.

With reference to FIG. 1, a 3-D CAD drawing of an object to be fabricated in the form of a data file is placed in the memory of a computer 12 controlling the operation of apparatus 10. In other words, an object design may be effected in a first computer in an engineering or research facility and the data files transferred via wide or local area network, tape, disc, CD-ROM or otherwise as known in the art to computer 12 of apparatus 10 for object fabrication. Alternatively, a 3-D CAD drawing of an object to be fabricated may be created using the computer 12 if the computer 12 has such CAD capabilities.

The data is preferably formatted in an STL (for StereoLithography) file, STL being a standardized format employed by a majority of manufacturers of stereolithography equipment. Fortunately, the format has been adopted for use in many solid-modeling CAD programs, so often translation from another internal geometric database format is unnecessary. In an STL file, the boundary surfaces of an object are defined as a mesh of interconnected triangles.

In addition to the computer 12, apparatus 10 includes a reservoir 14 configured to retain therein a curable liquid material 16 such as photopolymers commonly used with the above-referenced 3D Systems, Inc. apparatus to fabricate objects using stereolithography. The reservoir 14 is separable from apparatus 10 to allow reservoirs 14 of varying sizes, shapes and depths to be used or interchanged with the same apparatus 10. The reservoir 14 is, as shown, fairly shallow in comparison to its lateral extent so as to minimize the volume of curable liquid required since, as will become readily apparent from the following description, there is no need for a deep reservoir such as may be required in the prior art. Associated and in communication with reservoir 14 is a liquid displacement device 100, shown in FIG. 1 as including a piston 102 longitudinally slidable in cylinder bore 104 and movable responsive to drive assembly 106. Movement of piston 102 within cylinder bore 104 in communication with a column of curable liquid material 16 within conduit 108 extending from piston 102 to reservoir 14 permits adjustment of the surface level 18 of curable liquid material 16. Drive assembly 106 may comprise, by way of example only, a linear stepper motor or a screw drive to permit extremely fine adjustment of surface level 18 of curable liquid material 16. Other, alternative displacement devices may be employed. For example, a displacement mass 110 of a density so as to not be floatable in curable liquid material 16 may be suspended over curable liquid material 16 in reservoir 14 and selectively lowered and raised with respect to the volume of curable liquid material 16 to displace same, the displacement mass 110 being raised and lowered by a cable 112 paid out or retracted by rotation of a reel 114 by a reversible rotary drive assembly 116, exemplified by a rotary stepper motor. Yet another liquid displacement device 100 illustrated in FIG. 1 comprises a displacement head 120 at the lower end of a displaceable, vertical shaft 122 movable longitudinally upwardly and downwardly relative to curable liquid material 16 in reservoir 14 by a linear stepper motor or screw drive 124. All of the foregoing liquid displacement devices provide the ability to control precisely surface level 18 of curable liquid material 16 to within thousandths of an inch under initiation of computer 12. Precision in control and adjustment of the elevation of surface level 18 may be varied as desired or required by adjusting piston and bore cross-section, the minimum steps or rotational increments of a drive assembly, and the horizontal cross-sectional area of reservoir 14. Of course, a curable liquid source comprising a tank 126 connected, for example, to conduit 108 between piston 102 and reservoir 14 may be used to initially fill the liquid system comprising conduit 108, cylinder bore 104 and reservoir 14 to a desired volume, and to drain reservoir 14 after a stereolithographic process is completed. A reversible pump 128 may be used in combination with one or more valves 130 to quickly fill and drain the system, as desired. Alternatively, a pump may be used to fill the liquid system and gravity employed to drain it, or vice versa, depending on the relative locations of reservoir 14, liquid displacement device 100 and tank 126. As with other portions of the operation of apparatus 10, filling and draining of the liquid system may be effected at appropriate times under control of computer 12.

In the currently preferred embodiment, the curable liquid material 16 in the reservoir 14 is a photo-curable polymer or resin responsive to light in the UV wavelength range. Photopolymers believed to be suitable for use in practicing the present invention include Cibatool SL 5170 and SL 5210 resins for the SLA-250/50HR system, Cibatool SL 5530 resin for the SLA-5000 and Cibatool SL 7510 resin for the SLA-7000 system. All of these resins are available from Ciba Specialty Chemicals Inc. Curable liquid materials 16 are selected for dielectric constant, purity (semiconductor grade), and a coefficient of thermal expansion (CTE) sufficiently similar to that of the substrate to which the material is applied so that the substrate and cured material are not unduly stressed during thermal cycling in testing and subsequent normal operation.

A stationary platform 20 is disposed within reservoir 14, stationary platform 20 having a horizontal (as stationary platform 20 is placed within reservoir 14) upper surface 30 upon which one or more layered objects 50 may be formed according to the present invention. Unlike conventional stereolithogrophy apparatuses, there is no need for a deep reservoir 14 unless very tall layered objects 50 are to be formed therein since the stationary platform 20 need not move vertically during the layer formation process but, instead, the surface level 18 of curable liquid material 16 is caused to vary by liquid displacement device 100. Stationary platform 20 may merely comprise a plate placed on the bottom of reservoir 14, but more preferably comprises a base supported by a plurality of short legs 21, as shown in FIG. 1, to permit circulation of curable liquid material 16 there about within reservoir 14. Legs 21 may also be configured as adjustment elements, for example, threaded members in threaded bores, for level adjustments. More preferable, however, is to support reservoir 14 using an automated level adjustment system 23 controlled by computer 12 responsive to the outputs of three (3) laser range finders 200, discussed below.

Apparatus 10 also includes a UV wavelength range laser plus associated optics and galvanometers (collectively identified as laser 22) for controlling the scan of laser beam 26 in the X-Y plane across stationary platform 20 and has associated therewith mirror 24 to reflect laser beam 26 downwardly as laser beam 28 toward upper surface 30 of stationary platform 20. Laser beam 28 is traversed in a selected pattern in the X-Y plane, that is to say, in a plane parallel to upper surface 30, by initiation of the galvanometers under control of computer 12 to at least partially cure, by impingement thereon, selected portions of curable liquid material 16 disposed over a layered object 50 to at least a semisolid state. The use of mirror 24 lengthens the path of the laser beam 26, effectively doubling same, and provides a more vertical laser beam 28 than would be possible if the laser 22 itself were mounted directly above upper surface 30, thus enhancing resolution.

Data from the STL files resident in computer 12 is manipulated to build a layered object 50 one layer at a time. Accordingly, the data mathematically representing layered object 50 is divided into subsets, each subset representing a slice or layer of layered object 50. This is effected by mathematically sectioning the 3-D CAD model into a plurality of horizontal layers, a "stack" of such layers representing layered object 50. Each slice or layer may be from about 0.0001 to 0.0300 inch thick. A thinner slice promotes higher resolution by enabling better reproduction of fine vertical surface features of layered object 50. In some instances a base support or supports 52 for a layered object 50 may also be programmed as a separate STL file, such supports 52 being fabricated before the overlying layered object 50 in the same manner and facilitating fabrication of a layered object 50 with reference to a perfectly horizontal plane and removal of layered object 50 from upper surface 30 of stationary platform 20.

Before fabrication of layered object 50 is initiated with apparatus 10, the primary STL file for layered object 50 and the file for base support(s) 52 are merged. It should be recognized that, while reference has been made to a single layered object 50, multiple objects may be concurrently fabricated on upper surface 30 of stationary platform 20. In such an instance, the STL files for the various objects and supports, if any, are merged. Operational parameters for apparatus 10 are then set, for example, to adjust the size (diameter, if circular) of the laser light beam used to cure curable liquid material 16.

Before initiation of a first layer for fabrication of one or more supports 52 or layered objects 50 is commenced, computer automatically checks and, if necessary, adjusts by means known in the art a volume of curable liquid material 16 in the liquid system including reservoir 14, conduit 108 and cylinder bore 104 with piston 102 retracted to provide a maximum bore volume to maintain an appropriate amount of curable liquid material 16 in the liquid system to complete the stereolithographic process for an object or group of layered objects 50 to be formed on stationary platform 20.

As the stereolithographic process of the invention is initiated, at least one, and preferably a plurality of, downwardly aimed distance sensors, preferably in the form of laser range finders 200, located above reservoir 14 is triggered to determine a vertical distance D1 between a reference point over reservoir 14 and the upper surface 30 of stationary platform 20 before upper surface 30 is covered by curable liquid material 16. Laser range finders are known in the art. At least triangulation-type laser range finders are commercially available. Multiple laser range finders 200, and specifically three (3) laser range finders 200 aimed at laterally spaced portions of upper surface 30 of stationary platform 20, are preferred so as to enable computer 12 to verify that the upper surface 30 of stationary platform 20 is perfectly level, and to correct same through automated level adjustment system 23 acting on reservoir 14 responsive to signals from laser range finders 200 indicating that upper surface 30 is unlevel. Laser range finders 200 may be mounted to a support 202 also used to suspend mirror 24 over reservoir 14, for convenience. After measurement of distance D1 and leveling of stationary platform 20 as required, the surface level 18 of curable liquid material 16 in reservoir 14 is adjusted by displacement of piston 102 in cylinder bore 104 to cause more curable liquid material 16 to enter reservoir 14 and thus raise surface level 18 above upper surface 30. As noted previously, travel of piston 102 may be finely controlled by drive assembly 106 so that the depth of curable liquid material 16 above upper surface 30 finely approximates the thickness of a first layer 60 of a layered object 50 or support 52. The depth of curable liquid material 16 above upper surface 30 may be, and is preferably, verified before initiation of the first layer of a structure to be formed using one of the laser range finders 200 (only one is required since surface level 18 is self-leveling under gravitational force) to determine vertical distance D2 between surface level 18 and the reference point and the previously measured distance D1 between impingement point 24a and upper surface 30 and subtracting one distance from the other (D1−D2=liquid depth over surface 30). Of course, computer 12, in addition to performing the subtraction, may initiate further depth adjustment of curable liquid material 16 as required by movement of piston 102, followed by re-measurement of the vertical distance to confirm propriety of the depth adjustment in closed-loop fashion. If desired, and to speed flooding above platform surface and dissipation of any waves or turbulence, piston 102 may be over-displaced in cylinder bore 104 to over-flood upper surface 30, and then backed off to permit curable liquid material 16 to subside to a desired depth under repeated verification of laser range finders 200.

Responsive to its own determination of the distance D2 between the reference point and surface level 18 of curable liquid material 16 and thus between laser 22 and surface level 18, the distance between laser 22 and the reference point being substantially fixed, computer 12 then refocuses laser beam 26/28 as necessary in response to the detected distance between the surface level 18 of the curable liquid material 16 and the reference point to cause the focal point of laser beam 26/28 emanating from laser 22 to be located precisely at the surface level 18 of the curable liquid material 16. Such refocusing may be effected at laser 22 or, more preferably, is effected by movement of mirror 24. Laser 22 is then activated so that laser beam 28 will scan at least a portion of curable liquid material 16 over upper surface 30 of stationary platform 20 to at least partially cure (e.g., at least partially polymerize) curable liquid material 16 at selected locations to at least a semisolid state, defining the boundaries of a first layer 60 (of layered object 50 or support 52, as the case may be) and filling in solid portions thereof. Distance between the reference point associated with mirror 24 and surface level 18 is then remeasured, following which the depth and surface level 18 of curable liquid material 16 in reservoir 14 is then raised by a vertical distance equal to a desired thickness of a second layer 60 (which may be different than that of the first layer 60) as previously described. The liquid depth is then verified and readjusted as necessary, following which the laser 22 is refocused as necessary so that its focal point again lies at surface level 18 of the curable liquid material 16 and the laser beam 28 scanned to define and fill in the second layer 60 of layered object 50 (or support 52) while simultaneously bonding the second layer 60 to the first layer 60. The process is then repeated, layer by layer, until layered object 50 is completed. It is noted that the use of a machine vision system, as previously referenced, facilitates the present invention in that layered objects 50, once commenced, may thus be easily locationally re-verified prior to commencement of formation of each layer 60 to prevent slight offsets of layers 60 which might otherwise result over time due to movement of mirror 24 used to refocus laser beam 26/28.

Once a layered object 50 is formed, stationary platform 20 may be retrieved from reservoir 14. Excess, uncured curable liquid material 16 may be drained from stationary platform 20 by tilting same while still over reservoir 14 (augmented as desired by prior removal of uncured liquid material from reservoir 14), excess uncured curable liquid material 16 on the surface of layered object 50 may be manually removed and layered object 50 then solvent-cleaned and removed from stationary platform 20. If supports 52 were created, layered object 50 is cut from the supports 52.

Layered object 50 may then require postcuring, as any partially cured curable liquid material 16 may be only partially polymerized and exhibit only a portion (typically 40% to 60%) of its fully cured strength. Postcuring to completely harden layered object 50 may be effected in another apparatus projecting ultraviolet radiation in a continuous manner over layered object 50 and/or by thermal completion of the initial, ultraviolet initiated partial cure.

By way of example, and not limitation, the layer thickness of curable liquid material 16 to be formed may be on the order of 0.001 to 0.020 inch, with a high degree of uniformity over a field on stationary platform 20 upper surface 30. It should be noted that different material layers may be of different heights, so as to form a structure of a precise, intended total height or to provide different material thicknesses for different portions of a structure. The size of the laser beam "spot" impinging on the surface of curable liquid material 16 may be on the order of 0.002 inch to 0.008 inch. Resolution is preferably 0.0003 inch in the X-Y plane (parallel to upper surface 30) over at least a 0.5 inch by 0.25 inch field from a center point, permitting a high resolution scan effectively across a 1.0 inch by 0.5 inch area. Of course, it is desirable to have substantially this high a resolution across the entirety of upper surface 30 of stationary platform 20 to be scanned by laser beam 28, such area being termed the "field of exposure." The longer and more effectively vertical the path of laser beam 28 after reflection from mirror 24, the greater the achievable resolution. Typically, the downward path of laser beam 28 is within no more than 5 degrees of vertical.

A flood bar 32 may also be employed in the process of the invention. The surface level 18 of the curable liquid material 16 is made level with the highest layer 60 of layered object 50 through the addition of curable liquid material 16 to reservoir 14. Flood bar 32 then sweeps horizontally over surface level 18 of curable liquid material 16, thereby flooding curable liquid material 16 over upper surface 30, leaving a film of curable liquid material 16 of the precise, desired thickness on upper surface 30. Laser 22 is focused on the desired portion of curable liquid material 16 and is then initiated to scan with laser beam 28 and define the first layer 60. The process is repeated, layer by layer, to define each succeeding layer 60 and simultaneously bond same to the next lower layer 60 until layered object 50 is completed.

As an alternative to the above approaches to preparing a layer of curable liquid material 16 for scanning with laser beam 28, a layer of curable liquid material 16 may be formed on upper surface 30 by raising the liquid level in reservoir 14 to flood curable liquid material 16 over upper surface 30 or over the highest completed layer 60 of layered object 50, lowering the liquid level as previously mentioned and then horizontally traversing a so-called "meniscus" blade across the stationary platform 20 (or just the formed portion of layered object 50) one layer thickness thereabove, followed by liquid depth verification and focus and initiation of laser 22 for scanning of laser beam 28 to define the next higher layer 60.

Yet another alternative to layer preparation of curable liquid material 16 is to merely raise surface level 18 in reservoir 14 to provide a desired depth of curable liquid material 16 equal to that of a next layer 60 to be formed and then traverse a combination flood bar 32 and meniscus blade assembly horizontally over stationary platform 20 to substantially concurrently flood curable liquid material 16 over stationary platform 20 and define a precise layer thickness of curable liquid material 16 for focusing and scanning.

All of the foregoing approaches to flooding and layer definition are known and used in the art with fixed reservoirs, and so no further details relating thereto will be provided.

Figure 2:
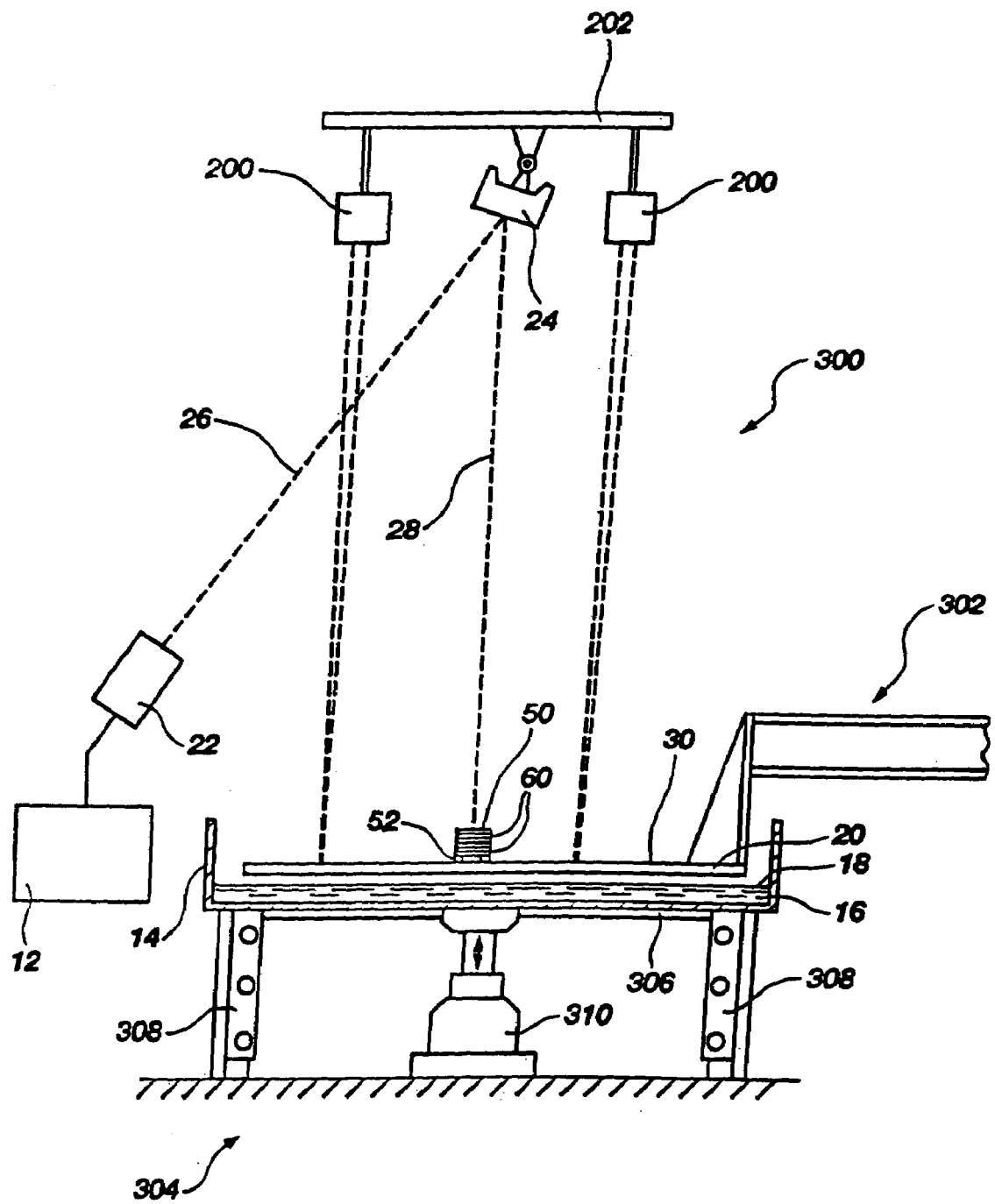
FIG. 2 illustrates a representative schematic side view of a second embodiment of the apparatus of the present invention.

Another embodiment of apparatus 300 of the present invention is illustrated in FIG. 2 of the drawings, wherein elements and features corresponding to those previously described with respect to apparatus 10 retain the same designation and reference numeral.

Apparatus 300 employs a reservoir 14 and a fixed or stationary platform 20 but, unlike in apparatus 10, stationary platform 20 is suspended within reservoir 14 by fixture 302 rather than resting on the bottom of reservoir 14. Further, instead of employing a liquid displacement device 100, reservoir 14 is supported in a vertically movable manner by lift mechanism 304. Lift mechanism 304 preferably precludes any lateral movement of reservoir 14 or of a support base 306 on which reservoir 14 rests, such as by the use of linear bearings 308 as known in the art. Lift mechanism 304 includes a drive assembly 310, which may comprise a linear stepper motor, a screw drive, or a rotary stepper motor operably coupled to drive a screw element. Thus, the vertical position of reservoir 14 and thus surface level 18 of curable liquid material 16 within reservoir 14 may be finely and precisely adjusted relative to stationary platform 20 and its upper surface 30 as with apparatus 10. Fabrication of layers 60 of one or more layered objects 50 or supports 52 may be effected in the same manner as with apparatus 10 using laser range finder(s) 200 for distance sensing and a closed loop control system to refine liquid depth and layer thickness of the curable liquid material 16 as well as refocusing laser beam 28 for optimum spot size at the focal point corresponding to detected surface level 18. Flooding of stationary platform 20 and the use of flood and meniscus bars as previously described may also be easily effected. As in the case of reservoir 14 of apparatus 10, reservoir 14 of apparatus 300 may be shallow to conserve curable liquid and also to reduce weight on lift mechanism 304.

Figure 3:
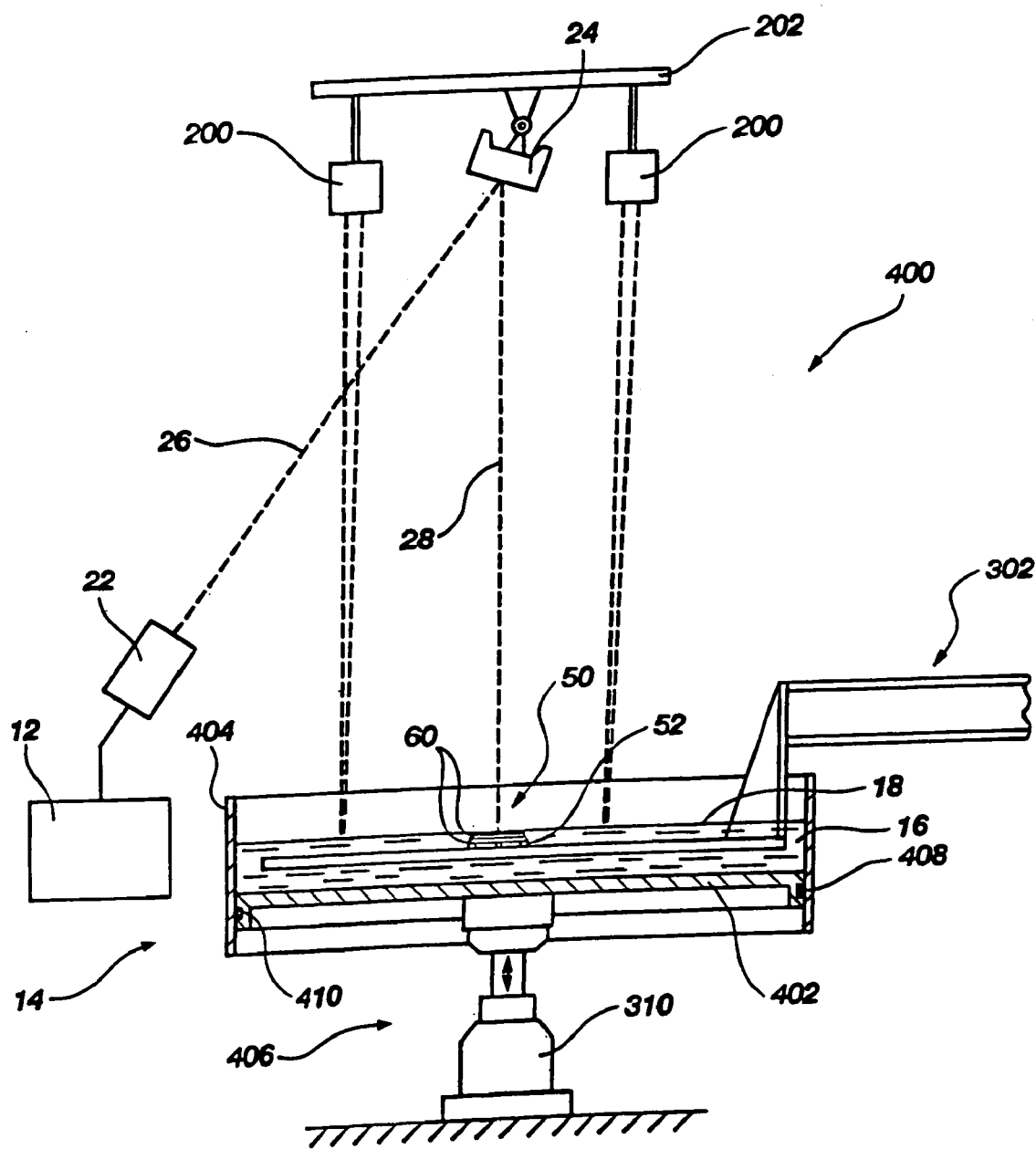
FIG. 3 illustrates a representative schematic side view of a third embodiment of the apparatus of the present invention.

In addition to the embodiments of the apparatus of the invention described above, the surface level 18 of curable liquid material 16 is also movable in yet another manner as depicted in FIG. 3. FIG. 3 illustrates another embodiment of apparatus 400 of the present invention, the remainder of the apparatus being as previously described herein. As in the case of FIG. 2, elements and features corresponding to those previously described with respect to apparatus 10 and 300 retain the same designation and reference numerals in FIG. 3. A plate 402 comprising a bottom in the reservoir 14 surrounded by sidewall 404 is vertically slidably movable therewithin responsive to a lift mechanism 406, which may include any of the precision drive assemblies 310 previously described with respect to apparatus 300. A peripheral face seal 408 is secured to the side of plate 402 which preferably includes an outer peripheral lip or apron 410 for mounting the peripheral face seal 408 (which may comprise multiple seals) and to prevent cocking or tilting of plate 402 as it moves. Lift mechanism 406 vertically moves the plate 402 of the reservoir 14 to cause vertical movement of the curable liquid material 16 contained within the reservoir 14 and thus of surface level 18. The embodiment illustrated in FIG. 3 is used in a similar manner as the embodiments of FIGS. 1 and 2. It will also be understood that a sidewall 404 of reservoir 14 may be configured as moveable instead of plate 402 to effect increases or decreases of the surface level 18 of curable liquid material 16 relative to upper surface 30 of stationary platform 20. With such a configuration, stationary platform 20, as in the first embodiment, may rest on the floor of the reservoir 14.

Figure 4:
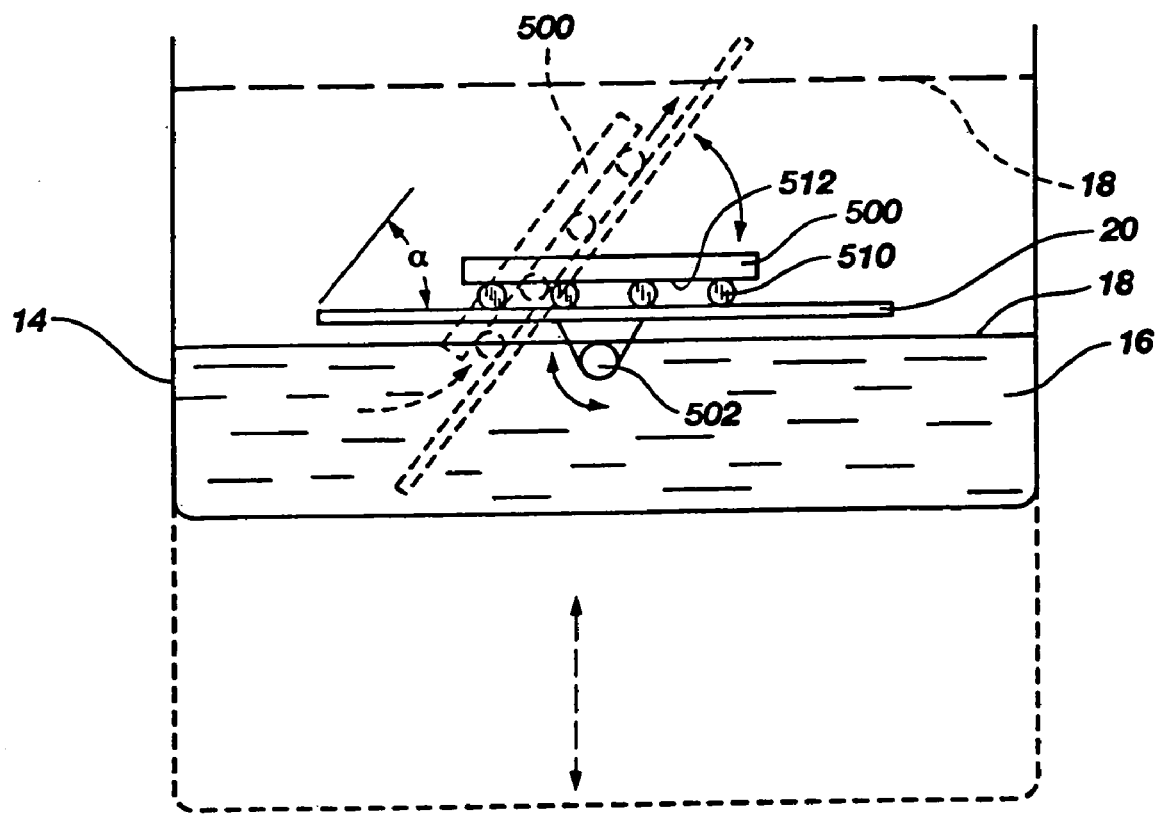
FIG. 4 illustrates a representative schematic side view of a portion of the apparatus of the present invention adapted for underfilling of preformed objects disposed above the platform of the apparatus of the invention.

FIG. 4 illustrates a variation of the apparatus of the present invention adapted to facilitate underfilling of objects, such as semiconductor dice, resting on stationary platform 20 with their under surfaces thereabove, such as is the case with flip-chip configured semiconductor dice or objects 500 resting active surface 512 down on solder bumps or other projecting external conductive elements 510. It has been found that when it is desirable to create stereolithographic structures over or adjacent existing, preformed objects, such as the aforementioned semiconductor dice 500, vertical immersion of the horizontally-oriented object or objects 500 into the curable liquid material 16 on stationary platform 20 may cause the trapping of air bubbles on the under surfaces of an object 500 which does not lie flat against upper surface 30 of a stationary platform 20. The trapping of air bubbles precludes substantially complete encapsulation of the undersides of such objects 500 and thus causes defects in any stereolithographic structures added to the underside of an object 500 when the air bubbles are trapped within a partially cured layer 60. As a result, when an object 500 comprises, for example and as illustrated, a flip-chip-type semiconductor die to be encapsulated, the object 500 may exhibit the so-called "popcorn effect" at elevated temperatures and literally explode due to trapped air, particularly in combination with moisture.

In order to alleviate this problem, stationary platform 20 is not fixed in a horizontal position within reservoir 14. Instead, stationary platform 20 is supported on a rotatable shaft 502 extended, for example, through one sidewall of reservoir 14 with a seal therebetween (in a non-movable reservoir embodiment); rotatable shaft 502 being rotatable to tilt stationary platform 20 from the horizontal through a selected angle α from the horizontal, for example, 10 to 90 degrees, by a drive assembly (not shown) comprising a rotary stepper motor or a screw and gear drive operably coupled to an electric motor. Tilt of stationary platform 20 is controlled by computer 12 such that stationary platform 20 holding an object 500 adjusts to a desired angle α at the time reservoir 14 is vertically moved or an additional volume of curable liquid material 16 added as shown in broken lines to raise surface level 18 to encompass all objects 500 on stationary platform 20 with curable liquid material 16. Tilting of stationary platform 20 is preferably effected prior to the surface level 18 of curable liquid material 16 being raised so that the rising surface level 18 sweeps or scrubs off any air bubbles or moisture from external conductive elements 510 and active surface 512, and may also be effected substantially concurrently with the tilting of stationary platform 20. The curable liquid material 16 thus floods under each object 500 being held at an angle α by stationary platform 20, displacing any air trapped under the objects 500. Once the tilted objects 500 are all submerged in curable liquid material 16, computer 12 gradually reduces the tilt of stationary platform 20 so that stationary platform 20 is substantially parallel to the surface level 18 of the curable liquid material 16. The surface level 18 of curable liquid material 16 within reservoir 14 is then lowered during or subsequent to reorientation of stationary platform 20 to the horizontal position, to provide a desired depth of curable liquid material 16 under and around the object 500 so that the stereolithographic process of the invention may be initiated, the laser beam 28 of electromagnetic radiation traversed and a dam or wall of at least partially cured curable liquid material 16 formed about object 500 to trap uncured curable liquid material 16 under active surface 512 for subsequent thermally-augmented curing. It will be recognized by those of skill in the art that the manner of surface level adjustment will depend on the embodiment of the apparatus of the present invention which is employed.

Having thus described certain preferred embodiments of the present invention, it is to be understood that the invention defined by the appended claims is not to be limited by particular details set forth in the above description. Those of ordinary skill in the art will recognize and appreciate that many additions, deletions and modifications to the disclosed embodiments as well as combining of features of different embodiments are possible without departing from the spirit or scope of the invention as hereinafter claimed.

What is claimed is:

1. An apparatus for providing at least an underfilled encapsulant structure for a flip-chip configured semiconductor device having a plurality of external conductive elements projecting from an active surface thereof, the apparatus comprising:
   a reservoir;
   a platform disposed in the reservoir and having an upper surface for supporting at least one semiconductor die thereon;

a drive assembly operably configured for tilting the platform to at least one selected acute angle to the horizontal within the reservoir;

a liquid displacement structure for selectively varying a surface level of a curable liquid material contained in the reservoir; and a source of electromagnetic radiation configured to generate, focus and traverse a substantially vertical beam of electromagnetic radiation over the platform.

2. The apparatus of claim 1, further comprising at least one sensor for providing data to make a determination as to a distance between a location on or above the platform and a reference location above the platform.

3. The apparatus of claim 2, wherein the at least one sensor comprises a plurality of sensors.

4. The apparatus of claim 3, wherein the plurality of sensors comprises a plurality of laser range finders disposed above the platform.

5. The apparatus of claim 2, wherein the source of electromagnetic radiation is adapted to vary a focal length of the beam of electromagnetic radiation responsive at least in part to provided data.

6. The apparatus of claim 5, wherein the source of electromagnetic radiation is adapted to vary a focal point of the beam of electromagnetic radiation to coincide with the surface level of the curable liquid within the reservoir.

7. The apparatus of claim 6, further comprising a computer for controlling tilting of the platform by the drive assembly, varying the surface level of the curable liquid with the liquid displacement structure, generating and traversing the beam of electromagnetic radiation with the source of electromagnetic radiation, and focusing the beam of electromagnetic radiation to a selected focal length using the data provided by the at least one sensor.

8. The apparatus of claim 7, wherein the computer is further adapted to control the liquid displacement structure to provide a selected depth of curable liquid above the platform upper surface.

9. The apparatus of claim 8, wherein the computer is further adapted to verify accuracy of the selected depth of curable liquid responsive to data provided by the at least one sensor.

10. The apparatus of claim 9, wherein the computer is adapted to control and terminate variance of the surface level of the curable liquid with the liquid displacement structure responsive to multiple samples of data provided by the at least one sensor during the variance process.

\* \* \* \* \*

UNITED STATES PATENT AND TRADEMARK OFFICE
CERTIFICATE OF CORRECTION

| | | |
|---|---|---|
| PATENT NO. | : 7,021,915 B2 | Page 1 of 1 |
| APPLICATION NO. | : 10/987843 | |
| DATED | : April 4, 2006 | |
| INVENTOR(S) | : Warren M. Farnworth | |

It is certified that error appears in the above-identified patent and that said Letters Patent is hereby corrected as shown below:

On the title page:
In ITEM (56) "References Cited,"
"U.S. Patent Documents,"
2nd page, 2nd column, 16th line,    change "Tochimolo et al." to --Tochimoto et al.--
Cited"

COLUMN 8,    LINE 3,    change "computer automatically" to
                                                             --computer 12 automatically--
      COLUMN 8,    LINE 49,   change "over surface" to --over upper surface--

Signed and Sealed this

Twenty-fourth Day of April, 2007

JON W. DUDAS
*Director of the United States Patent and Trademark Office*